(12) United States Patent
Jin

(10) Patent No.: US 12,736,697 B2
(45) Date of Patent: Sep. 15, 2026

(54) METHOD AND APPARATUS FOR IMPLEMENTING FULL WAVEFORM INVERSION USING ANGLE GATHERS

(71) Applicant: BP Corporation North America Inc., Houston, TX (US)

(72) Inventor: Hu Jin, Houston, TX (US)

(73) Assignee: BP Corporation North America Inc., Houston, TX (US)

( * ) Notice: Subject to any disclaimer, the term of this patent is extended or adjusted under 35 U.S.C. 154(b) by 387 days.

(21) Appl. No.: 18/503,846

(22) Filed: Nov. 7, 2023

(65) Prior Publication Data

US 2024/0159930 A1 May 16, 2024

Related U.S. Application Data

(60) Provisional application No. 63/424,432, filed on Nov. 10, 2022.

(51) Int. Cl.
*G01V 1/28* (2006.01)
*G01V 1/30* (2006.01)
*G01V 1/36* (2006.01)

(52) U.S. Cl.
CPC .............. *G01V 1/282* (2013.01); *G01V 1/303* (2013.01); *G01V 1/362* (2013.01);
(Continued)

(58) Field of Classification Search
CPC ...... G01V 1/3808; G01V 1/001; G01V 1/282; G01V 1/303; G01V 2210/679;
(Continued)

(56) References Cited

U.S. PATENT DOCUMENTS 8,600,708 B1 * 12/2013 Mallet .................... G01V 1/345 703/2
9,058,302 B2 * 6/2015 Magerlein ............... G06F 17/16
(Continued)

OTHER PUBLICATIONS

Tarantola: "Inversion of seismic reflection data in the acoustic approximation", Geophysics, Society of Exploration Geophysicists, US, vol. 49, No. 8, Jan. 1, 1984.
(Continued)

*Primary Examiner* — Daniel Previl
(74) *Attorney, Agent, or Firm* — Conley Rose, P.C.

(57) ABSTRACT

A method for implementing a full waveform inversion (FWI) process using angle gathers includes; receiving observed seismic data associated with a subsurface region and captured by one or more seismic receivers, constructing based on the observed seismic data, a scalar velocity model and one or more vector velocity model partitions, where the one or more vector velocity model partitions correspond to one or more unique seismic angles. The method further includes determining one or more vector gradients using the scalar velocity model and the observed seismic data, and updating the one or more vector velocity model partitions using the one or more vector gradients. Additionally, the method also includes determining residual data by comparing synthetic data produced by the scalar velocity model with the observed seismic data, migrating the residual data backwards through time to determine one or more vector gradients, and determining the one or more unique seismic angles as the residual data is migrated backwards through time.

19 Claims, 6 Drawing Sheets

(52) U.S. Cl.
CPC .. *G01V 2210/512* (2013.01); *G01V 2210/614* (2013.01); *G01V 2210/6222* (2013.01); *G01V 2210/667* (2013.01); *G01V 2210/67* (2013.01)

(58) Field of Classification Search
CPC ........ G01V 1/189; G01V 1/301; G01V 1/362; G01V 1/38; G01V 2001/207; G01V 2210/1293; G01V 2210/1297; G01V 2210/1423; G01V 2210/144; G01V 2210/512; G01V 2210/614; G01V 2210/6222; G01V 2210/667; G01V 2210/67; G01V 1/00; G01V 3/00; G01V 5/00; G01V 7/00; G01V 8/00; G01V 9/00; G01V 11/00; G01V 13/00; G01V 15/00; G01V 20/00; G01V 99/00; G01V 2200/00; G01V 2210/00; G01V 2210/51; G01V 1/137; G01V 1/186; G01V 1/305; G01V 1/306; G01V 1/345; G01V 1/3843; G01V 1/50; G01V 2210/1212; G01V 2210/22; G01V 2210/622; G01V 1/28; G01V 1/325; G01V 2210/514; G01V 2210/64; G01V 2210/665; G01V 2210/673; G01S 15/04; G01S 5/00; G01S 3/00; G01S 7/00; G01S 11/00; G01S 13/00; G01S 15/00; G01S 17/00; G01S 19/00; G01S 2201/00; G01S 2205/00; G01S 1/72; G01S 1/70; G01S 1/02; G01S 1/00; G06F 17/17; G06F 18/214; G06N 20/00; G06N 20/10; G06N 3/0464; G06N 3/08; G06N 3/09; G06T 3/06; G06V 10/255; G06V 10/7715; G06V 10/774; G06V 20/64; G06V 10/00; G06V 20/00; G06V 30/00; G06V 40/00; G06V 2201/00
USPC ..... 340/853.1, 853.7, 903, 992–994, 426.19, 340/539.22, 539.28, 588, 691.6
See application file for complete search history.

(56) References Cited

U.S. PATENT DOCUMENTS

| | | | |
|---|---|---|---|
| 10,670,751 | B2 | 6/2020 | Qin et al. |
| 2010/0067326 | A1* | 3/2010 | Iranpour .............. G01V 1/3808 367/20 |
| 2016/0327668 | A1* | 11/2016 | Pires De Vasconcelos ................. A61B 8/0866 |
| 2017/0234998 | A1* | 8/2017 | Asgedom ................. G01V 1/38 702/14 |
| 2018/0059276 | A1* | 3/2018 | Roberts .................. G01V 1/282 |
| 2018/0335532 | A1 | 11/2018 | Tsingas et al. |
| 2019/0179047 | A1 | 6/2019 | Kim et al. |

OTHER PUBLICATIONS

International Search Report and Written Opinion dated Feb. 13, 2024, for Application No. PCT/US2023/078937.

* cited by examiner

METHOD AND APPARATUS FOR IMPLEMENTING FULL WAVEFORM INVERSION USING ANGLE GATHERS

CROSS-REFERENCE TO RELATED APPLICATIONS

This application claims benefit of U.S. provisional patent application Ser. No. 63/424,432 filed Nov. 10, 2022, and entitled "Methods and Apparatus for Implementing Full Waveform Inversion Using Angle Gathers," which is hereby incorporated herein by reference in its entirety for all purposes.

STATEMENT REGARDING FEDERALLY SPONSORED RESEARCH OR DEVELOPMENT

Not applicable.

BACKGROUND

Seismic surveying is a method of exploration geophysics in which seismology is used to estimate properties of earthen subsurface regions from reflected seismic waves. Seismic surveying generally includes imparting acoustic or sound waves into a natural environment so that the waves enter the Earth and travel through a subsurface region of interest. As the seismic waves encounter an interface between two materials of the subsurface region, some of the wave energy is reflected off of the interface where the reflected wave energy may be recorded at the surface as seismic data associated with the subsurface region, while some of the wave energy refracts through the interface and penetrates deeper into the subsurface region. The reflected wave energy recorded at the surface as seismic data may be studied to ascertain information about the subsurface region. For example, the recorded seismic data may be used to construct a velocity model of the subsurface region which models the velocity of the seismic waves passing through the subsurface region so as to translate subsurface reflection points of the seismic waves to their true depth within the formation.

SUMMARY

An embodiment of a method for implementing a full waveform inversion (FWI) process using angle gathers comprises (a) receiving observed seismic data associated with a subsurface region and captured by one or more seismic receivers; (b) constructing based on the observed seismic data, one or more vector velocity model partitions, wherein the one or more vector velocity partitions correspond to one or more unique seismic angles; (c) determining one or more vector gradients using the scalar velocity model and the observed seismic data; and (d) updating the one or more vector velocity model partitions using the one or more vector gradients. In some embodiments, the method further comprises (e) determining residual data by comparing synthetic data produced by the scalar velocity model with the observed seismic data; and (f) migrating the residual data backwards through time to determine the one or more vector gradients. In other embodiments, the method further comprises (g) determining the one or more unique seismic angles as the residual data is migrated backwards through time. In some embodiments, the one or more unique angles comprises at least one of a reflection angle and an azimuth angle. In certain embodiments, the one or more unique seismic angles comprises both a reflection angle and an azimuth angle. In other embodiments, (b) comprises constructing an initial one or more vector velocity model partitions from the observed seismic data, and (d) comprises iteratively updating the one or more vector velocity partitions using the one or more vector gradients. In certain embodiments the method further comprises generating synthetic data from the scalar velocity model. In other embodiments, the method comprises determining residual data by comparing the synthetic data with the observed seismic data. In still other embodiments, the one or more vector gradients comprises a plurality of separate vector gradients, and (d) comprises applying a single step length to each of the plurality of separate vector gradients.

An embodiment of a system for implementing a full waveform inversion (FWI) process using angle gathers comprises a processor, a non-transitory memory, and one or more applications stored in the non-transitory memory that when executed by the processor, access observed seismic data associated with at least a portion of a subsurface formation from a seismic data acquisition device; construct based on the observed seismic data, one or more vector velocity model partitions, wherein the one or more vector velocity partitions correspond to one or more unique seismic angles; generate based on the scalar velocity model, synthetic data; determine a one or more vector gradients using the scalar velocity model and the observed seismic data; and update the one or more vector velocity model partitions using the one or more vector gradients. In some embodiments, the one or more applications stored in the non-transitory memory, when executed by the processor, select a final vector velocity model based on a predefined threshold, and generate one or more images of the subsurface formation using the one or more vector velocity model partitions. In some embodiments, the one or more applications stored in the non-transitory memory, when executed by the processor determine residual data by comparing synthetic data produced by the scalar velocity model with the observed seismic data; and migrate the residual data backwards through time to determine the one or more vector gradients. In some embodiments, the one or more applications stored in the non-transitory memory, when executed by the processor determine the one or more unique seismic angles as the residual data is migrated backwards through time. In certain embodiments, the one or more unique seismic angles comprises at least one of a reflection angle and an azimuth angle. In other embodiments, the one or more vector gradients comprises a plurality of separate vector gradients, and the one or more applications stored in the non-transitory memory, when executed by the processor, update the one or more vector velocity model partitions using the one or more vector gradients by applying a single step length to each of the plurality of separate vector gradients.

An embodiment of a method for implementing a full waveform inversion (FWI) process using angle gathers comprises (a) receiving observed seismic data associated with a subsurface region and captured by one or more seismic receivers; (b) constructing based on the observed seismic data, a scalar velocity model of the subsurface region and one or more vector velocity model partitions that are different from the scalar velocity model, wherein the one or more vector velocity partitions correspond to one or more unique seismic angles; (c) determining a scalar gradient using the scalar velocity model and the observed seismic data, (d) determining one or more vector velocity gradients using the scalar velocity model and the observed seismic data; wherein, the scalar gradient comprises the sum or weighted average of the vector gradients (e) updating the scalar velocity model using the scalar gradient, and (f) updating the one or more vector velocity model partitions using the one or more vector gradients. In some embodiments, the scalar velocity model comprises a normalized stack of the one or more vector velocity model partitions, the vector velocity model partitions being stacked along the one or more unique seismic angles. In certain embodiments, the one or more unique seismic angles comprises at least one reflection angle and at least one azimuth angle. In other embodiments, the method comprises (g) selecting a final velocity model based on a predefined threshold, and (h) generating one or more images of the subsurface region using the one or more vector velocity model partitions. In still other embodiments, the one or more unique seismic angles comprises at least one of a refection angle and an azimuth angle.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which.

DETAILED DESCRIPTION

Figure 1:
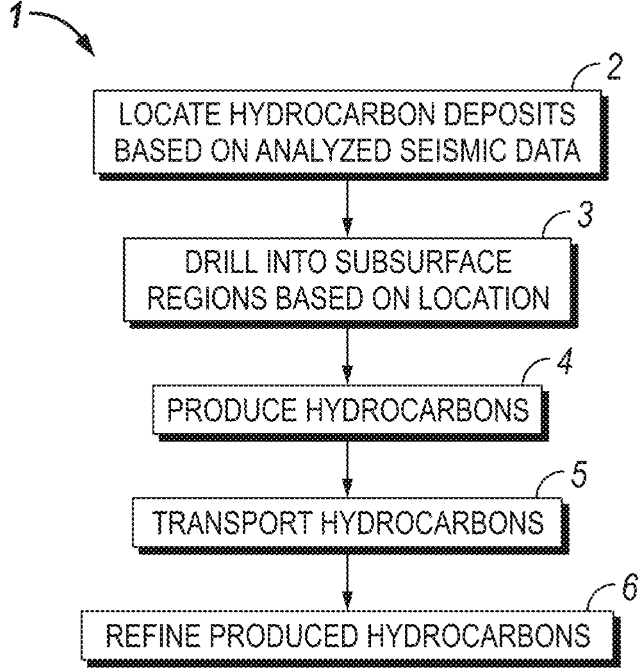
FIG. 1 is a flow chart of various processes that may be performed based on analysis of seismic data acquired via a seismic survey system.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in the interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a particular axis (e.g., central axis of a body or a port), while the terms "radial" and "radially" generally mean perpendicular to a particular axis. For instance, an axial distance refers to a distance measured along or parallel to the axis, and a radial distance means a distance measured perpendicular to the axis. As used herein, the terms "approximately," "about," "substantially," and the like mean within 10% (i.e., plus or minus 10%) of the recited value. Thus, for example, a recited angle of "about 80 degrees" refers to an angle ranging from 72 degrees to 88 degrees.

As described above, seismic surveys reflect seismic waves off of features of earthen subsurface regions in order to collect information regarding the subsurface regions. The information collected from the reflected seismic waves may be used to create velocity models and seismic images which may be used to identify subterranean features of interest such as, for example, hydrocarbon deposits. As an example, in some applications an iterative data-fitting process such as a full waveform inversion (FWI) process may be applied to the collected seismic data to form a velocity model therefrom.

An FWI process may begin with an initial estimate of a velocity model and recorded seismic data. The method can create a synthetic model based on a geometry of the recorded data and the velocity model to produce synthetic seismic data, which the method can then compare with the corresponding recorded seismic data. The velocity model is then updated using a data misfit, and the process can repeat. The iterations can terminate when the magnitude of the misfit between the synthetic and recorded data becomes sufficiently small.

Reverse-time migration (RTM) is a process for creating an image of the subsurface using a velocity model (e.g., a velocity model created using a FWI process) and recorded seismic data. In RTM processes, the source wavefields (e.g., the transmitted seismic signals generated by corresponding seismic sources) are computed using the known source locations by migrating the modeled source wavefields forwards in time. Conversely, the corresponding receiver wavefields (e.g., the reflected seismic signals received by corresponding seismic receivers) are computed using the known receiver locations by migrating the recorded seismic data backwards in time to a point of reflection in which the two corresponding wavefields are coincident in location and time. Many "imaging conditions" exist via which an image may be calculated using the time histories of the source and receiver wavefields at each subsurface point. For example, one imaging condition is simply to multiply the source and receiver wavefields together time step by time step and then sum the results over time.

Calculations performed to update a FWI velocity model can, in some instances, be mathematically similar to calculations performed as a part of RTM processes. Particularly, at each iteration of an exemplary FWI process, instead of migrating the receiver wavefields backwards in time from the receivers as with RTM processes, a data misfit (also referred to herein as "residual data") between synthetic or simulated data generated via the FWI model (e.g., reflected seismic signals simulated by the FWI velocity model) and the collected or observed seismic data (e.g., the reflected seismic signals collected from the seismic signals) is migrated backwards in time. An image may be created by cross-correlating the backwards migration of the data misfit, where the image defines a gradient for updating the FWI velocity model.

Prior to updating the velocity model using the obtained gradient, the gradient must be scaled using an appropriate or optimal scale factor also referred to as a "step length" of the gradient. The scaled gradient, possibly following the application of windowing, tapering, and/or other signal conditioning techniques, is then summed with the FWI velocity model to produce an updated FWI velocity model which may then be subsequently updated during a following iteration of the FWI process. This exemplary process of determining the FWI velocity model update is sometimes referred to as "steepest descent." However, several other variations for determining the FWI velocity model update are practiced including, for example, the use of a weighted sum of both the current gradient and the gradient from a previous iteration (referred to sometimes as "conjugate gradients") of the FWI process.

Conventional RTM processes typically produce a scalar image of a subsurface region such that each subsurface grid point of the scalar image corresponds to a single image value. In addition, various enhanced RTM processes have been proposed for producing vector images of subsurface regions. As an example, an exemplary first enhanced RTM process partitions the collected seismic data and subsequently executes an RTM process on each partition separately. However, executing a separate RTM process for each partition is generally computationally expensive making this partition-based enhanced RTM process unsuitable for many applications. Moreover, it is often desirable to partition the collected seismic data by propagation direction at the subsurface points and it is typically difficult to map the partitions back to the seismic data geometry as recorded at the surface (e.g., at the seismic receivers).

An exemplary second enhanced RTM process produces RTM angle gathers. As used herein, the term "angle gathers" is defined as a collection of seismic traces sharing a common reflection angle or a common azimuth angle, as will be discussed further herein. Additionally, as used herein, the term "reflection angle" is defined as half of the angle formed between a transmitted seismic signal and a reflected seismic signal (e.g., where the transmitted seismic signal is reflected by a subsurface reflector). Further, as used herein, the term "azimuth angle" is defined as the angle of the plane containing both the transmitted and reflected directions.

In angle gather RTM processes a local propagation direction at each subsurface point is determined via, for example, ray tracing, a calculated Poynting vector, an optical flow process, or the wavefield itself may be partitioned by performing a Fourier transform whereby the wavefield may be broken up into a sum of directional components. In any case, the original single scalar wavefield amplitude at each subsurface point is subdivided into a plurality of distinct or separate bins. In some instances, the sum of the bins for each subsurface point produces the original scalar value of the respective subsurface point (referred to sometimes as a "partition of unity"); however, this may not be true in all cases.

With the original single scalar wavefield amplitude subdivided into a plurality of separate bins (e.g., source wavefield bins and receiver wavefield bins) for each subsurface point, a vector RTM imaging condition may then be applied to both the source wavefield and the receiver wavefield bins for each subsurface point. As an example, the source and receiver wavefields may be partitioned by propagation direction thereby forming a plurality of separate source wavefield propagation-direction bins and a plurality of separate receiver wavefield propagation-direction bins for each subsurface point.

The plurality of source wavefield propagation-direction bins and the plurality of receiver wavefield propagation-direction bins for each subsurface point may be combined in different, unique combinations (e.g., a first source wavefield propagation-direction bin may be combined with a first receiver wavefield propagation-direction bin, the first source wavefield propagation-direction bin may be combined with a second receiver wavefield propagation-direction bin, a second source wavefield propagation-direction bin may be combined with the first receiver wavefield propagation-direction, and so on and so forth).

Generally, in angle gather RTM processes, for each unique combination of source and receiver propagation-direction bins, an opening or "reflection angle" and an "azimuth angle" may be determined. In this manner, the vector RTM imaging condition may thereby produce a separate image for each of a range of combinations of opening angles and azimuths per each subsurface point. As with conventional RTM processes, angle gather RTM processes may be performed at each time step and subsequently summed over time. Mathematically, angle gather RTM processes considers the output image at each subsurface point (which in conventional RTM processes would be a scalar) as a function of one or more parameters derived from the properties of the source and receiver wavefields as the imaging condition is performed at each subsurface point. One salient advantage of angle gather RTM processes relative to conventional RTM processes is that some features of interest within the subsurface region which may become muddled and lost in the global sum performed by scalar imaging associated with conventional RTM processes, may instead be well imaged by certain components of the source and receiver wavefields associated with angle gather RTM processes.

Velocity models produced by FWI processes can also be directly converted into a kind of subsurface image in a process sometimes referred to as FWI-Derived Reflectivity (FDR). Particularly, a derivative normal to the local layering may be taken at each subsurface point, although processes under the general category of "coherency cubes" can alternatively be used to extract an image from the FWI velocity model. In some instances, FDR images illustrate features not adequately imageable by RTM processes. FDR may thus reveal subsurface features or structures of interest that cannot be clearly illustrated in subsurface images produced using conventional RTM processes.

In at least some instances, it is desirable to obtain both the benefits of angle gathers and FDR. According to one conventional technique, the data is partitioned to independently run FWI and then separately calculate FDR images for each partition of the data. However, this is computationally expensive and it is difficult to associate subsurface wavefields at the image points with the surface recording geometry, limiting what kinds of partitions may be used.

Accordingly, embodiments of systems and methods for implementing FWI using angle gathers is disclosed herein. Particularly, according to some embodiments, methods for implementing FWI using angle gathers includes determining the subsurface angles (e.g., reflection angle, azimuth angle) during the migration process (e.g., as the data misfit is migrated backwards through time) rather than prior to the migration process as a preprocessing step which may produce inferior results. In addition, according to some embodiments, methods for implementing FWI using angle gathers utilizes a single step length or scale factor across all angle components (e.g., across each angle gather), maximizing the stability of the FWI velocity model as it is updated from one iteration to the next. Particularly, partitioning the collected seismic data and executing multiple FWI processes in parallel on the resulting partitioned seismic data generally requires the usage of different step lengths varying in magnitude for at least some of the parallel FWI processes, resulting in potential divergence between the FWI velocity models constructed from the parallel FWI processes as additional iterations are executed. In turn, the divergence of the constructed FWI velocity models may result in FDR images generated from the FWI velocity models becoming difficult to compare with each other and difficult to combine, limiting the utility of the resulting FDR images. Conversely, by utilizing a step length of the same magnitude across the entire data set (e.g., across each angle gather), the issue of divergence driven by the different step lengths may be avoided such that the resulting FDR images may be easily and conveniently compared and/or combined.

In some embodiments, methods for implementing FWI using angle gathers disclosed herein includes embedding RTM with angle gathers processes in the FWI workflow. Particularly, according to some embodiments, the method includes iteratively updating a conventional three-dimensional (3D) scalar FWI velocity model along with a vector or five-dimensional (5D) vector FWI velocity model. In this manner, with each iteration the scalar FWI velocity model is updated using a scaled (scalar) gradient (determined from the collected seismic data and the misfit data) along with the vector FWI velocity model where the vector FWI velocity model is updated using a scaled vector gradient. The scaled vector gradient may be determined from combinations of different partitions of the collected seismic data and the misfit data.

In an embodiment, the vector gradient is "a partition of unity" where the sum of the partitions is the same as the entire, unpartitioned scalar gradient. In this manner, the step length or scale factor applied to both the scalar gradient and the vector gradient may have equal magnitude, permitting the scalar FWI velocity model and vector FWI velocity model to update in lockstep and thereby avoiding divergence therebetween. The partitioning of the scalar gradient accounts for all of the vector gradient fields.

While the same step length may be applied to both the scalar gradient and the vector gradient during a respective iteration of the FWI implementation, it may be understood that the magnitude of the step length may vary from one iteration to another in some embodiments. For example, in some embodiments, the scale length may be scaled whereby larger steps are taken in earlier iterations while smaller steps are taken in later iterations (following the earlier iterations) in order to maximize the performance (e.g., the accuracy) of the constructed FWI velocity models.

In some embodiments, in the interest of maximizing computational efficiency the update of the scalar FWI velocity model and the update of the vector FWI velocity model are not performed or calculated independently, and instead comprise a pair of products obtained from a joint calculation. As an example, in certain embodiments, the scalar gradient determined at each iteration of the FWI implementation comprises a weighted average of the components or partitions of the vector gradient. In certain embodiments, the step length is determined from the stacked scalar gradient which is then used to weight both the update for the scalar FWI velocity model and the updates (e.g., the update for each respective reflection and/or azimuth angle) for the vector FWI velocity model. The scalar FWI velocity model constructed in this exemplary embodiment may vary (e.g., the step lengths may vary between the respective FWI implementations) from at least some other scalar FWI velocity models constructed using conventional FWI implementation processes, but generally are comparable in quality (e.g., with respect to its performance, accuracy) while eliminating the undesirable and inefficient requirement of updating the scalar FWI velocity model separately from and parallel with updating the vector FWI velocity model.

In some embodiments, the scalar gradient comprises the sum or weighted average of the vector gradients (e.g., the vector gradients for the plurality of angles of the vector FWI velocity model). The manner in which the step length is determined (e.g., from the determined scalar gradient) may vary depending on the respective embodiment. In some embodiments, conjugate gradients are utilized in which the update to the FWI velocity model is performed using a conjugate gradient comprising the weighted sum of the current gradient and the gradient from the previous iteration where the respective weights are crafted so as to minimize the resulting data misfit.

According to some embodiments, methods for implementing FWI using angle gathers disclosed herein produces both a finalized scalar FWI velocity model and an accompanying supplementary vector FWI velocity model. In some embodiments, the FWI implementation may generate a finalized scalar FWI velocity model along with a plurality of distinct, supplementary vector FWI velocity models where the different vector FWI velocity models are partitioned differently (e.g., one according to reflection angle, another according to azimuth angle, and so on and so forth) and/or utilizing different vector imaging conditions. For example, in certain embodiments of the present disclosure, RTM (or wave equation migration) vector-offset gathers (5D) with horizontal and vertical offsets, RTM (or wave equation migration) scalar-offset gathers (4D), or RTM (wave-equation migration) vector-offset-output gathers may be used. Additionally, according to some embodiments, the scalar FWI velocity model and the vector FWI velocity model are generated using an inversion method such as, for example, a conjugate gradient method, a steepest descent method, and/or other inversion methods. In some embodiments, by using the same step length applied to both the scalar gradient and the vector gradient, least-square RTM gathers with these different vector imaging conditions (including angle gathers) may be implemented.

Figure 2:
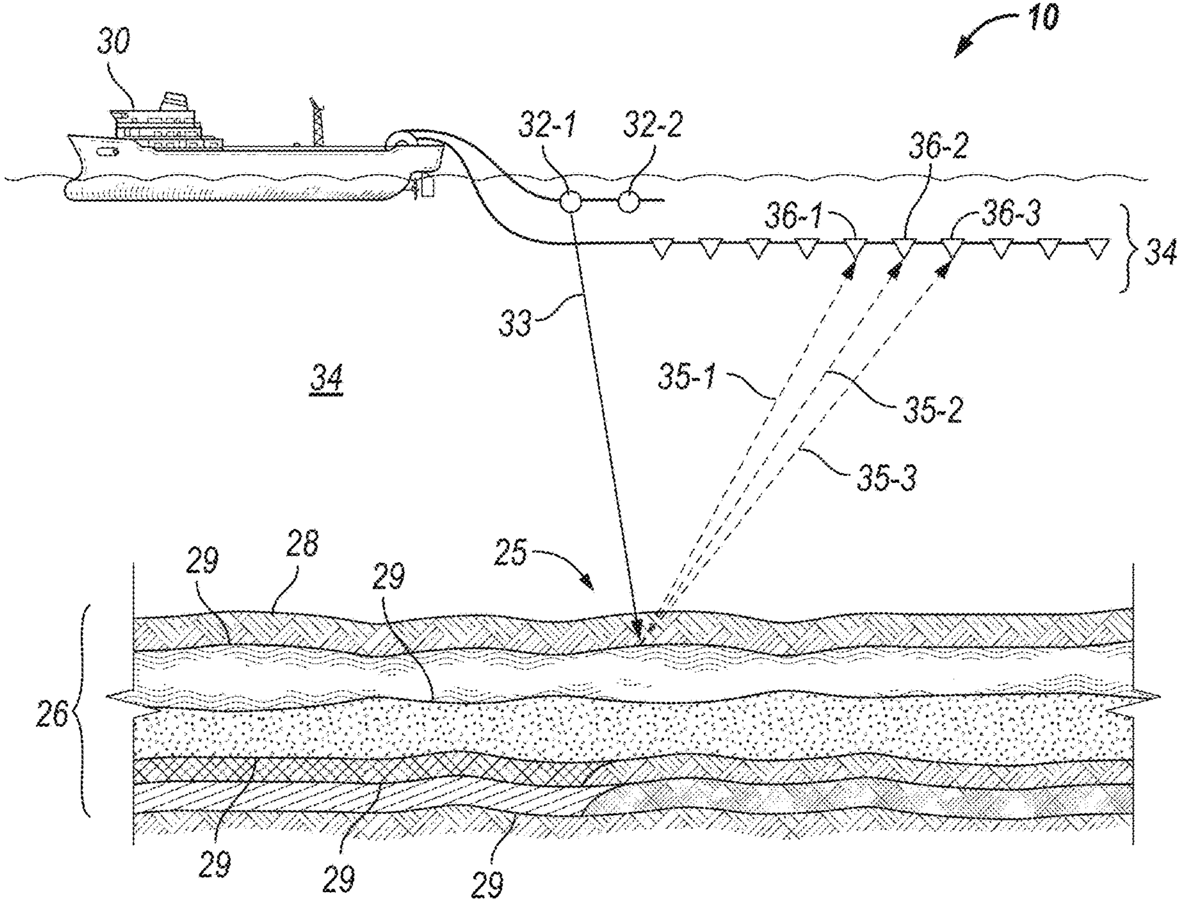
FIG. 2 is a schematic view of an embodiment of a system for performing a marine seismic survey.
Figure 3:
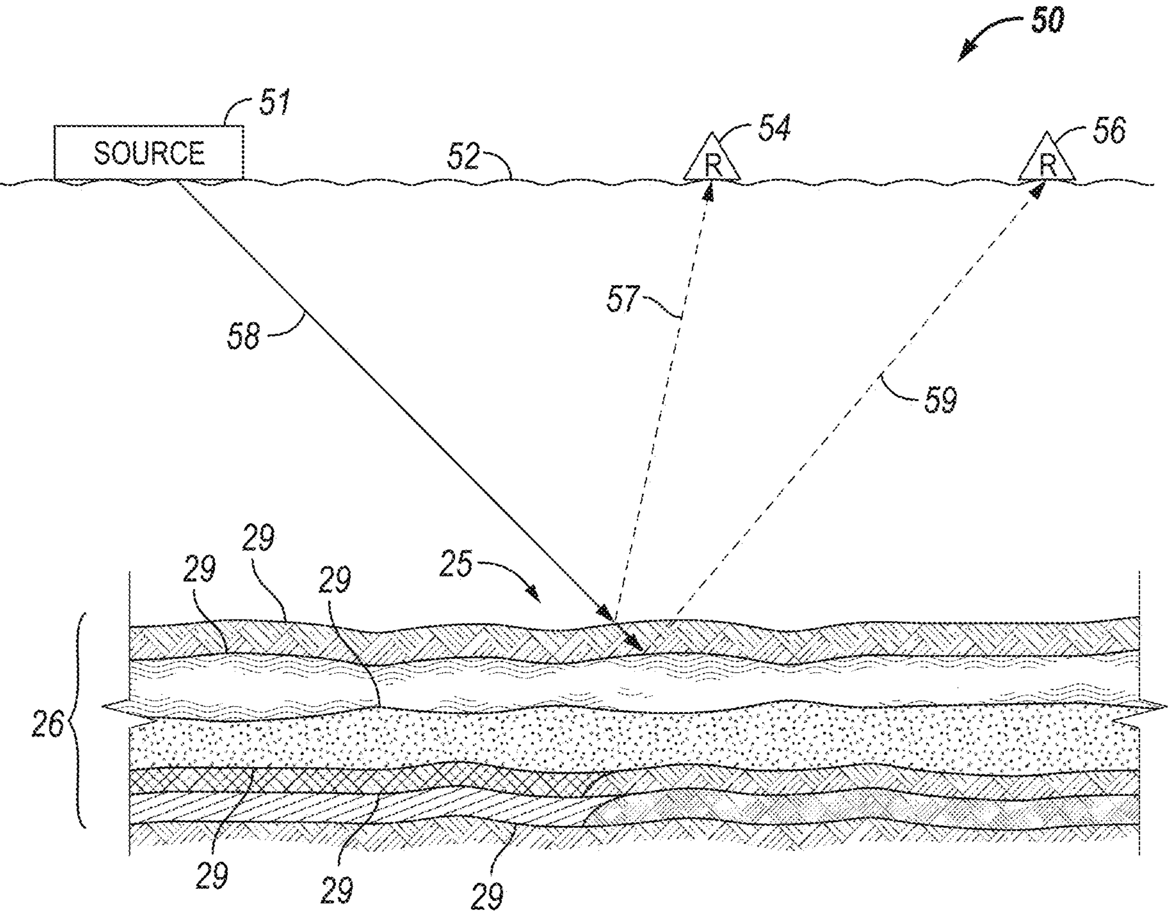
FIG. 3 is a schematic view of an embodiment of a system for performing a land-based seismic survey.

By way of introduction, seismic data may be acquired using a variety of seismic survey systems and techniques, two of which are discussed with respect to FIGS. 2-3. Regardless of the seismic data gathering technique utilized, after the seismic data is acquired, a computer system may analyze the acquired seismic data and may use the results of the seismic data analysis (e.g., seismogram, map of geological formations, etc.) to perform various operations within the hydrocarbon exploration and production industries. For instance, and referring initially to FIG. 1, a flow chart of a method 1 is illustrated that details various processes that may be undertaken based on the analysis of the acquired seismic data. Although the method 1 is described in a particular order, it should be noted that the method 1 may be performed in any suitable order.

Referring now to FIG. 1, at block 2, method 1 comprises determining, based on analyzed seismic data, locations and properties of hydrocarbon deposits within a subsurface region of the Earth associated with the respective seismic survey. In one embodiment, the seismic data acquired may be analyzed to generate a map or profile that illustrates various geological formations within the subsurface region. Based on the identified locations and properties of the hydrocarbon deposits, at block 3, method 1 comprises exploring certain positions or parts of the subsurface region. That is, hydrocarbon exploration organizations may use the locations of the hydrocarbon deposits to determine locations at the surface of the subsurface region to drill into the Earth. As such, the hydrocarbon exploration organizations may use the locations and properties of the hydrocarbon deposits and the associated overburdens to determine a path along which to drill into the Earth, how to drill into the Earth, and the like.

After exploration equipment has been placed within the subsurface region, at block 4, method 1 comprises producing hydrocarbons that are stored in the hydrocarbon deposits via natural flowing wells, artificial lift wells, and the like. At block 5, method 1 comprises transporting produced hydrocarbons to refineries and the like via transport vehicles, pipelines. At block 6, method 1 comprises processing the produced hydrocarbons according to various refining procedures to develop different products using the hydrocarbons.

The processes discussed with regard to the method 1 may include other suitable processes that may be based on the locations and properties of hydrocarbon deposits as indicated in the seismic data acquired via one or more seismic survey. As such, it should be understood that the processes described above are not intended to depict an exhaustive list of processes that may be performed after determining the locations and properties of hydrocarbon deposits within the subsurface region.

Referring to FIG. 2, an embodiment of a marine survey system 10 that may be employed to acquire seismic data (e.g., waveforms) regarding a subsurface region of the Earth in a marine environment. Generally, a marine seismic survey conducted using the marine survey system 10 shown in FIG. 2 may be conducted in an ocean 24 or other body of water over a subsurface region 26 of the Earth that lies beneath a seafloor 28. In this exemplary embodiment, marine survey system 10 generally includes a marine vessel 30, one or more seismic sources 32, a seismic streamer 34, one or more seismic receivers 36, and/or other equipment that may assist in acquiring seismic images representative of geological formations within the subsurface region 26 of the Earth. Particularly, a pair of seismic sources 32-1 and 32-2 are illustrated in FIG. 2; however, it may be understood that marine survey system 10 may include any number of seismic sources 32 including only a single seismic source 32. Similarly, seismic receivers 36-1, 36-2, and 36-3 are particularly shown and labeled in FIG. 2; however, it may be understood that the number of seismic receivers 36 of marine survey system 10 may vary from that shown in FIG. 2.

The marine vessel 30 may tow the seismic sources 32 (e.g., an array of air guns) over an area of interest (AOI) 25 of the subsurface region as the seismic sources 32 repeatedly produce sound waves (e.g., emitted seismic waves indicated by arrow 33 in FIG. 2) that are directed at the seafloor 28 and towards the AOI 25. As the emitted seismic waves 33 penetrate through the subsurface region 26, some of the seismic energy of the seismic waves 33 is reflected off of one or more subsurface reflectors 29 formed within the subsurface region 26 such that the reflected seismic energy (e.g., reflected seismic waves indicated by arrow 35 in FIG. 2) travels towards the surface. Subsurface reflectors 29 of subsurface region 26 may comprise a variety of diverse geological features and formations including, for example, salt domes, faults, folds, and other features.

As the marine vessel 30 tows the seismic sources 32 over the AOI 25, the marine vessel 30 may concurrently tow the seismic receivers 36 (e.g., hydrophones) which capture the reflected seismic waves 35 that represent the energy output by the seismic sources 32 subsequent to being reflected off of the reflectors 29 within the subsurface region 26. The seismic waves 35 received by seismic receivers 36 travel along different trajectories from the respective reflector 29 to their corresponding seismic receivers 36. As an example, FIG. 2 illustrates three separate reflected seismic waves 35-1, 35-2, and 35-3 received by separate seismic receivers 36-1, 36-2, and 36-3.

Referring again to FIG. 2, the reflected seismic waves 35 captured by seismic receivers 36 comprises seismic data which may be processed by a computer system to generate one or more images and/or velocity models associated with the subsurface region 26. For example, images constructed from the captured seismic data may depict visually various features of the subsurface region 26 including at least some of reflectors 29 of the subsurface region 26. Additionally, velocity models constructed from the captured seismic data may be used to estimate the vertical depth (from the seafloor 28) of various features of the subsurface region 26 including at least some of the reflectors 29 thereof. It may be understood that the seismic data gleaned from the capture of a reflected seismic wave 35 by a seismic receiver 36 is contingent on or conditioned by both the reflection angle θ and the azimuth angle of the reflected seismic wave 35.

The images, velocity models, and other information gleaned from the captured seismic data may be utilized in locating hydrocarbon deposits within subsurface region 26. For example, the captured seismic data may be analyzed to generate a map or profile that illustrates various geological formations within the subsurface region 26. Based on the identified locations and properties of the hydrocarbon deposits determined from the captured seismic data, certain positions or parts (e.g., AOI 25) of the subsurface region 26 may be explored. That is, hydrocarbon exploration organizations may use the locations of the hydrocarbon deposits to determine locations at the surface (seafloor 28 in this exemplary embodiment) of the subsurface region 26 to drill into the Earth. As such, the hydrocarbon exploration organizations may use the locations and properties of the hydrocarbon deposits and the associated overburdens to determine a path along which to drill into the Earth, how to drill into the Earth, and the like. After exploration equipment has been placed within the subsurface region, the hydrocarbons that are stored in the identified hydrocarbon deposits may be produced via natural flowing wells, artificial lift wells, and the like.

It may be understood that the number of seismic sources 32 and the number of seismic receivers 36 of the marine survey system 10 may vary depending on the given application. In the same manner, although marine survey system 10 is described with one seismic streamer 34, it should be noted that the marine survey system 10 may include multiple streamers similar to streamer 34. Additionally, while seismic sources 32 are described as air guns and seismic receivers 36 are described as hydrophones in this exemplary embodiment, the configuration of sources 32 and receivers 36 may vary in other embodiments. Further, additional marine vessels 30 may include additional seismic sources 32, seismic streamers 34, and the like to perform the operations of the marine survey system 10.

Referring now to FIG. 3, an embodiment of a land survey system 50 that may be employed to obtain information, including captured seismic data, regarding the subsurface region 26 of the Earth in a non-marine environment. In this exemplary embodiment, and survey system 50 generally includes a land-based seismic source 51 and land-based receiver 54. In some embodiments, the land survey system 50 may include multiple land-based seismic sources 50 and one or more land-based receivers 54 and 56. Indeed, for discussion purposes, the land survey system 50 includes a land-based seismic source 51 and two land-based receivers 54 and 56.

The land-based seismic source 51 (e.g., a seismic vibrator) of land survey system 50 may be disposed on a surface 52 of the Earth above the subsurface region 26 of interest. The land-based seismic source 51 may produce energy (e.g., emitted seismic waves indicated by arrow 58 in FIG. 3) that is directed at the subsurface region 26 of the Earth. Upon reaching various subsurface reflectors 29 (e.g., salt domes, faults, folds) within the subsurface region 26, the energy output by the land-based seismic source 51 may be reflected (e.g., reflected seismic waves indicated by arrows 57 and 59 in FIG. 3) off of the subsurface reflectors 29, and captured by one or more land-based seismic receivers (e.g., seismic receivers 54 and 56).

In some embodiments, the land-based seismic receivers 54 and 56 may be dispersed across the surface 52 of the Earth to form a grid-like pattern. As such, each land-based seismic receiver 54 or 56 may receive a reflected seismic wave 57 or 59 in response to energy being directed at the subsurface region 26 via the seismic source 51. In some cases, one seismic waveform produced by the seismic source 51 may be reflected off of different subsurface reflectors 29 and received by different seismic receivers 54 and 56. For example, as shown in FIG. 3, a first seismic receiver 54 may receive the reflection of the emitted seismic waveform 58 off of a first reflector 29 while a second seismic receiver 56 may receive the reflection of the seismic waveform 58 off of a second reflector 29. As such, the first seismic receiver 54 may receive a reflected seismic wave 57 and the second seismic receiver 56 may receive a reflected seismic wave 59.

Figure 4:
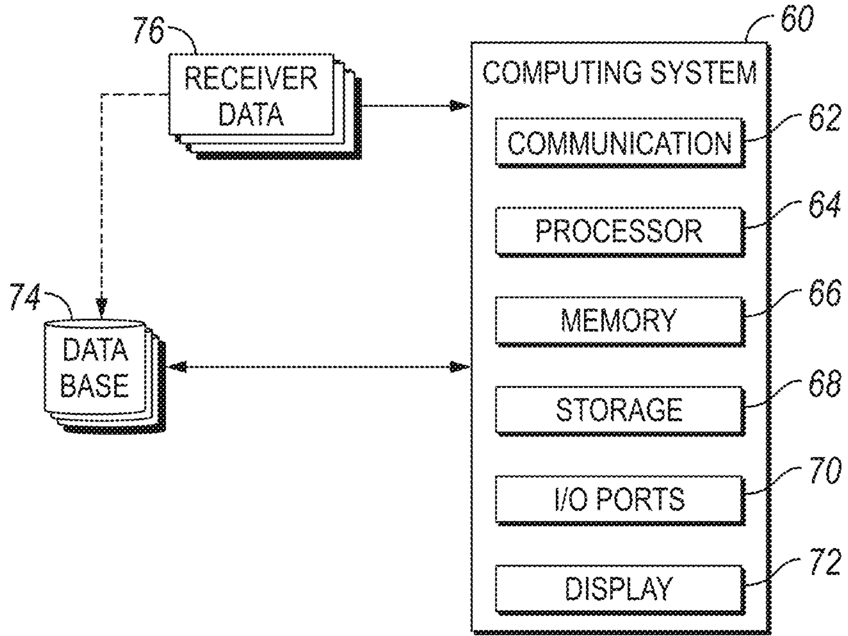
FIG. 4 is a block diagram of an embodiment of a computer system that may perform operations described herein based on data acquired via the marine survey system of FIG. 2 and/or the land systems of FIG. 3.

Regardless of how the seismic data is acquired, a computer system may analyze the seismic waveforms acquired by the seismic receivers (e.g., seismic receivers 36, 42, 54, and 56 of survey systems 10, 40 and 50 described above) to determine seismic information regarding the geological structure, the location and property of hydrocarbon deposits, and the like within the subsurface region 26. Referring now to FIG. 4, a block diagram of an embodiment of such a computer system 60 that may perform various data analysis operations to analyze the seismic data acquired by the receivers 36, 42, 54, 56 to determine the structure and/or predict seismic properties of the geological formations within the subsurface region 26.

In this exemplary embodiment, computer system 60 generally includes a communication component 62, a processor 64, memory 66, storage 68, input/output (I/O) ports 70, and a display 72. In some embodiments, the computer system 60 may omit one or more of the display 72, the communication component 62, and/or the (I/O) ports 70. The communication component 62 may be a wireless or wired communication component that may facilitate communication between the seismic receivers (e.g., seismic receivers 36, 42, 54, and 56), one or more databases 74, other computing devices, and/or other communication capable devices. In one embodiment, the computer system 60 may receive receiver data 76 (e.g., captured seismic data, seismograms, etc.) via a network component, databases 74, or the like. The processor 64 of the computer system 60 may execute instructions stored on the memory 66 to analyze or process the receiver data 76 to ascertain various features regarding geological formations within the subsurface region 26. As will be discussed further herein, processor 64 may particularly execute instructions stored on memory 66 to construct one or more images and/or one or more velocity models of the subsurface region 26.

The processor 64 may be any type of computer processor or microprocessor capable of executing computer-executable code. The processor 64 may also include multiple processors that may perform the operations described below. The memory 66 and the storage 68 may be any suitable articles of manufacture that can serve as media to store processor-executable code, data, or the like. These articles of manufacture may represent computer-readable media (e.g., any suitable form of memory or storage) that may store the processor-executable code used by the processor 64 to perform the presently disclosed techniques. Generally, the processor 64 may execute software applications that include programs that process seismic data acquired via receivers of a seismic survey according to the embodiments described herein.

The memory 66 and the storage 68 may also be used to store the data, analysis of the data, the software applications, and the like. The memory 66 and the storage 68 may represent non-transitory computer-readable media (e.g., any suitable form of memory or storage) that may store the processor-executable code used by the processor 64 to perform various techniques described herein. It should be noted that non-transitory merely indicates that the media is tangible and not a signal.

The I/O ports 70 may be interfaces that may couple to other peripheral components such as input devices (e.g., keyboard, mouse), sensors, input/output (I/O) modules, and the like. I/O ports 70 may enable the computer system 60 to communicate with the other devices in the marine survey system 10, the land survey system 50, or the like via the I/O ports 70.

The display 72 may depict visualizations associated with software or executable code being processed by the processor 64. In one embodiment, the display 72 may be a touch display capable of receiving inputs from a user of the computer system 60. The display 72 may also be used to view and analyze results of the analysis of the acquired seismic data to determine the geological formations within the subsurface region 26, the location and property of hydrocarbon deposits within the subsurface region 26, predictions of seismic properties associated with one or more wells in the subsurface region 26, and the like. The display 72 may be any suitable type of display, such as a liquid crystal display (LCD), plasma display, or an organic light emitting diode (OLED) display, for example. In addition to depicting the visualization described herein via the display 72, it should be noted that the computer system 60 may also depict the visualization via other tangible elements, such as paper (e.g., via printing) and the like.

With the foregoing in mind, the present techniques described herein may also be performed using a supercomputer that employs multiple computer systems 60, a cloud-based computer system, or the like to distribute processes to be performed across multiple computer systems 60. In this case, each computer system 60 operating as part of a supercomputer may not include each component listed as part of the computer system 60. For example, each computer system 60 may not include the display 72 since multiple displays 72 may not be useful to for a supercomputer designed to continuously process seismic data.

After performing various types of seismic data processing, the computer system 60 may store the results of the analysis in one or more databases 74. The databases 74 may be communicatively coupled to a network (e.g., a wide area network like the Internet) that may transmit and receive data to and from the computer system 60 via the communication component 62. In addition, the databases 74 may store information regarding the subsurface region 26, such as previous seismograms, geological sample data, seismic images, and the like regarding the subsurface region 26.

Although the components described above have been discussed with regard to the computer system 60, it should be noted that similar components may make up the computer system 60. Moreover, the computer system 60 may also be part of the marine survey system 10 and/or the land survey system 50, and thus may monitor and control certain operations of the seismic sources 32 or 51, the seismic receivers 36, 54, 56, and the like. Further, it should be noted that the listed components are provided as example components and the embodiments described herein are not to be limited to the components described with reference to FIG. 4.

In some embodiments, the computer system 60 may generate a two-dimensional representation or a three-dimensional representation of the subsurface region 26 based on the seismic data received via the receivers mentioned above. Additionally, seismic data associated with multiple seismic source/receiver combinations may be combined to create a near continuous profile of the subsurface region 26 that can extend for some distance. In a two-dimensional (2D) seismic survey, the receiver locations may be placed along a single line, whereas in a three-dimensional (3D) survey the receiver locations may be distributed across the surface in a grid pattern. As such, a 2D seismic survey may provide a cross sectional picture (vertical slice) of the Earth layers as they exist directly beneath the recording locations. A 3D seismic survey, on the other hand, may create a data "cube" or volume that may correspond to a 3D picture of the subsurface region 26. In either case, a seismic survey may be composed of a very large number of individual seismic recordings or traces. As such, the computer system 60 may be employed to analyze the acquired seismic data to obtain an image representative of the subsurface region 26 and, using the obtained image, determine locations and properties of desired hydrocarbon deposits within the subsurface region 26 which may be later extracted. To that end, a variety of seismic data processing algorithms may be used to remove noise from the acquired seismic data, migrate the pre-processed seismic data, identify shifts between multiple seismic images, align multiple seismic images, and the like.

Figure 5:
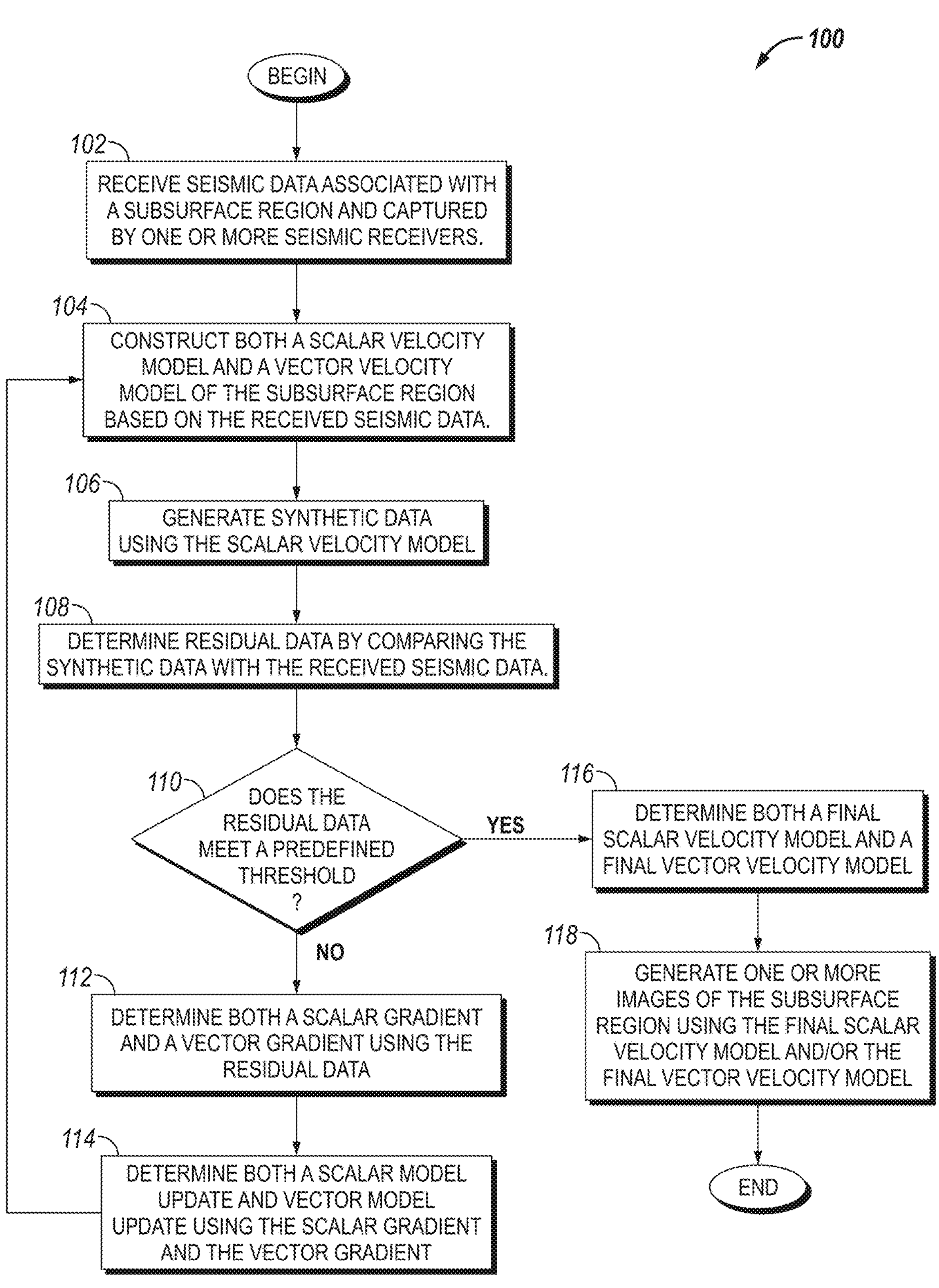
FIG. 5 is a flowchart illustrating an embodiment of a method for implementing full waveform inversion using angle gathers.

Referring now to FIG. 5, an embodiment of a method 100 implementing FWI using angle gathers is shown. At least some, if not all, of the steps or "blocks" of method 100 shown in FIG. 5 may be executed by the computer system 60 shown in FIG. 4, although it may be understood that at least some of the steps of method 100 may be executed by systems other than computer system 60. Additionally, it may be understood that the implementation of FWI described by method 100 may be used for a variety of purposes, including volumetric analysis and in the planning of one or more wells which would extend through the subsurface region.

Beginning at block 102, method 100 includes receiving seismic data associated with a subsurface region (e.g., subsurface region 26) and captured by one or more seismic receivers (e.g., seismic receivers 36, 54, and 56). The seismic data received at block 102 comprises reflected seismic data that, after being emitted from a seismic source (e.g., seismic sources 32 and 51), is reflected off of subsurface reflectors (e.g., subsurface reflectors 29) formed in the subsurface region and subsequently captured by the one or more seismic receivers.

As an example, in some embodiments, the seismic data received at block 102 comprises observed data in the form of seismic traces $d_k$ for each activation or shot k of one or more seismic sources (e.g., seismic sources 32 and 51) as observed or received by one or more corresponding seismic receivers (e.g., seismic receivers 36, 54, and 56). As described above, the seismic sources and/or seismic receivers may be spaced from one another resulting in the formation of varying reflection and/or azimuth angles between corresponding pairs of seismic sources and seismic receivers. Thus, each seismic trace $d_k$ may correspond to a specific reflection angle and a specific azimuth angle which may vary from the reflection and/or azimuth angles of other seismic traces $d_k$. In addition, the seismic traces vary from the actual source wavelets $a_k$ (e.g., seismic waves 33, 58) generated by the seismic sources and may be unknown in at least some applications. Further, it may be understood that the seismic data received at block 102 may not be received or downloaded directly from the seismic sources themselves, and instead may be received or downloaded from a separate storage medium or memory device.

At block 104, method 100 includes constructing both a scalar velocity model (also referred to herein as a "3D velocity model") and a vector velocity model (also referred to herein as a "5D velocity model") of the subsurface region based on the seismic data received at block 102. The scalar and vector velocity models may each model the interval velocity of the subsurface region thereby translating the time-domain seismic data into depth-domain data. In some embodiments, block 104 comprises applying or implementing FWI processes to construct the scalar and vector velocity models of the subsurface region.

Particularly, the FWI processes applied at block 104 may comprise iterative data-fitting processes in which an initial scalar velocity model ($M_0$) and an initial vector velocity model ($M_0(\theta)$) of the subsurface region are constructed and from which synthetic, modeled seismic data (e.g., scalar synthetic modeled seismic data) may be generated. Both the scalar velocity model and the vector velocity model may comprise one or more associated model parameters that are updated iteratively as will be discussed further herein. In certain embodiments, a single initial scalar velocity model is constructed and a plurality of partitioned vector velocity models (also referred to herein as vector velocity model partitions) are constructed where each vector velocity model partition is associated with a particular angle θ, where the angle θ represents a reflection angle and/or an azimuth angle that is specific to a respective velocity vector model partition.

At block 106, method 100 includes generating synthetic data (e.g., forward modeling the synthetic data using an FWI process) using the scalar velocity model constructed at block 104. Not intending to be bound by any specific theory, the synthetic data generated at block 106 may be generated in accordance with Equation (1) presented below, where A represents a mapping matrix (a modeling operator which maps the seismic data from the model space to the data space to generate data from the model), $m_0$ represents the initial model parameters for the respective scalar velocity model, and $u_k$ represents the predicted seismic wavefields or synthetic data over a given computation domain for each shot k:

$$A(m_0)=u_k \quad (1)$$

At block 108, method 100 includes determining residual data by comparing the synthetic data generated at block 106 with the seismic data received at block 102. The residual data determined at block 108 may also be referred to herein as the data mismatch. In some embodiments, residual data may be determined at block 108 for each shot k thus potentially including shots k at varying reflection and/or azimuth angles. Not intending to be bound by any particular theory, in some embodiments, the residual data may be determined in accordance with Equation (2) presented below, where $r_k$ represents the residual data for each shot k, $P_k$ represents the picking matrix (e.g., a sampling operator which takes the wavefields for a particular shot k and reduces it to the given seismic receivers), and $s_k$ is the observed seismic data:

$$r_k=P_k u_k-S_k \quad (2)$$

In some embodiments, $r_k$ represents the difference between the synthetic seismic data generated by the given scalar velocity model and the seismic data received at block 102 for at least some of the seismic receivers which originally measured or detected the given seismic data.

At block 110, method 100 includes determining whether the residual data meets a predefined threshold. In some embodiments, block 110 comprises determining an output from an objective function (also referred to sometimes as a "cost function" and a "misfit function") which compares the synthetic data (e.g., $u_k$) generated by a respective velocity model with the corresponding observed seismic data (e.g., $s_k$). Not intending to be bound by any particular theory, an exemplary objective function (J(M)) of a given velocity model M is presented in Equation (3) below for each source location i:

$$J(M)=\Sigma_i\|u_i(M)-s_i\| \quad (3)$$

In some embodiments, the predefined threshold comprises a predefined error determined using the objective function. By meeting the predefined threshold, the residual data determined at block 108 results in the output of the objective function for the given iteration of the velocity model that equals or is less than (e.g., the error is equal to or less than) the predefined threshold. Additionally, while block 110 is shown in FIG. 5 as following block 108, it may be understood that in other embodiments the location of block 110 may vary from that shown in FIG. 5 (e.g., in some embodiments block 110 may instead follow blocks 112 or 114).

In some embodiments, the scalar velocity model corresponds to a scalar objective function J(M) which includes data encompassing all range of reflection and/or azimuth angles. At block 112, method 100 includes determining both a scalar gradient and a vector gradient using the residual data determined at block 108 in response to determining the residual data fails to meet the predefined threshold at block 110. In some embodiments, the scalar gradient comprises the derivatives of their respective objective functions (e.g., ∇J(M) for the single scalar velocity model M. In some embodiments, the scalar gradient field at each time step of the iteration may be calculated from combinations of partitions of the source and misfit waveforms. In one embodiment, the vector gradient fields are "a partition of unity" and their sum is the same as the 3D scalar gradient field. In some embodiments, the 3D scalar gradient field may be calculated by stacking the vector gradient along the angles and azimuth; gradi=$(1/N)\Sigma_\theta$ gradi(θ), where N is the number of vector partitions, and θ represents both reflection and azimuth angles. In still other embodiments, the scalar gradient field at each time step of the iteration, may be calculated as the sum or weighted average of the vector gradient field. In practice, this process eliminates the need to run the scalar algorithm in parallel within the vector algorithm, which is more efficient. In each case the gradient may be positive or negative and may represent the direction and rate of fastest increase (for a positive gradient) or decrease (for a negative gradient). As an example, some of the vector gradients (for a given iteration of the FWI process) may be positive in magnitude while others may be negative in magnitude.

At block 114, method 100 includes determining both a scalar model update and a vector model update using the scalar gradient and the vector gradient, respectively, determined at block 112. In some embodiments, block 114 comprises applying a scaled search direction to the current iteration of the respective velocity model (e.g., a scalar velocity model or one or more vector velocity model partitions). Initially, in some embodiments, block 114 includes determining a scalar search direction. Not intending to be bound by any particular theory, the scalar search direction may be determined in accordance with Equation (4) presented below, where $Sdir_i$ represents the scalar search direction for the current iteration i of the FWI process (e.g., as embodied by the method 100 shown in FIG. 5), grad; represents the scalar gradient (e.g., as determined at block 112) for the current iteration i, and β represents a first step length (e.g., a gradient step length or a step length for FWI image gathers), θ represents the reflection and azimuth angle, and $Sdir_{i-1}$ represents the scalar search direction for the preceding iteration i−1 of the FWI process. In steepest descent method, the second term, $\beta*Sdir_{i-1}$ is eliminated in equation (4) below.

$$Sdir_i=-grad_i+\beta*Sdir_{i-1} \quad (4)$$

Similarly, one or more vector search directions may be determined at block 114. Not intending to be bound by any particular theory, the vector search direction may be determined in accordance with Equation (5) presented below, where $Sdir_i(\theta)$ represents the vector search direction for a given angle θ (e.g., a given reflection angle and/or a given azimuth angle) and for the current iteration i of the FWI process (e.g., as embodied by the method 100 shown in FIG. 5), $grad_i(\theta)$ represents the vector gradient (e.g., as determined at block 112) for the given angle θ and for the current iteration i, and $Sdir_{i-1}(\theta)$ represents the vector search direction for the given angle θ and for the preceding iteration i of the FWI process:

$$Sdir_i(\theta)=-grad_i(\theta)+\beta*Sdir_{i-1}(\theta) \quad (5)$$

In some embodiments, the sum of the (normalized) plurality of vector search directions (in an embodiments in which a plurality of vector velocity model partitions are constructed and updated corresponding to a plurality of angles θ) equals the scalar search direction for a given iteration i of the FWI process. In addition, the scalar and vector search directions in this exemplary embodiment comprise a conjugate or weighted sum of the gradient of the current iteration and the scaled (via the gradient step length β) step length of the previous iteration. However, in other embodiments, the scalar and/or vector search directions may not be based on the search directions of the previous iteration. In steepest descent method, the second term, $\beta^*\mathrm{Sdir}_{i-1}(\theta)$ is eliminated, so the scaled gradient itself is the search direction, otherwise it is computed based on current gradient and the search direction of the previous iteration. Both scalar and vector search directions (reflected in Equations (4) and (5)) use the same step length 13 that is obtained from the 3D scalar gradients.

In some embodiments, once the scalar search direction and the one or more vector search directions have been determined, block 114 may additionally include updating the scalar velocity model. As an example, and not intending to be bound by any particular theory, the scalar velocity model may be updated in accordance with Equation (6) presented below, where $M_i$ represents the scalar velocity model for the current iteration i of the FWI process, a represents a second step length (e.g., the update or FWI step length), and $M_{i+1}$ represents the updated scalar velocity model for the subsequent iteration i+1 of the FWI process:

$$M_{i+1}=M_i+\alpha^*\mathrm{Sdir}_i \tag{6}$$

In addition, at block 114 the one or more vector velocity model partitions may also be updated. As an example, and not intending to be bound by any particular theory, the vector velocity model may be updated in accordance with Equation (7) presented below, where Mi(θ) represents the vector velocity model partition for the current iteration i of the FWI process, and $M_{i+1}(\theta)$ represents the updated vector velocity model partition for the subsequent iteration i+1 of the FWI process:

$$M_{i+1}(\theta)=M_i(\theta)+\alpha^*S\mathrm{dir}_i(\theta) \tag{7}$$

In some embodiments, the sum of the (normalized) updated vector velocity model partitions (in an embodiment in which a plurality of vector velocity model partitions are constructed and updated corresponding to a plurality of angles θ) equals the updated scalar velocity model for a given iteration i of the FWI process. In some embodiments, update step length α and gradient step length β are determined from the scalar gradient (grad in Equation (4) above). Both scalar and vector velocity updates (equations 6 and 7) use the same step length α that is obtained from the 3D scalar gradient and/or data residual. There are many conventional methods for calculating the step lengths α and β from the 3D scalar gradient field. For example, in classic conjugate gradients, the update is a weighted sum of the current gradient and the gradient from the previous iteration, with the weights calculated so as to minimize the resulting data misfit.

At block 116, method 100 includes determining both a final scalar velocity model and a final vector velocity model (e.g., one or more vector velocity model partitions) in response to determining the residual data meets the predefined threshold at block 110. In some embodiments, the final scalar velocity model and the final vector velocity model comprise the velocity models having the model parameters of the current iteration of the method 100 and from which the residual data satisfying the condition of block 110 may be obtained. In certain embodiments, the final vector velocity model comprises one or more vector velocity model partitions each corresponding to a unique angle θ (e.g., a reflection angle and/or an azimuth angle).

At block 118, method 100 includes generating one or more images of the subsurface region using the final scalar velocity model and/or the final vector velocity model (e.g., one or more vector velocity model partitions). In some embodiments, by taking the derivative of the vector velocity model (Mi+1(θ)) normal to the interface, an FWI-derived reflectivity (FDR) image for each range of opening angles and azimuths may be generated.

Figure 6:
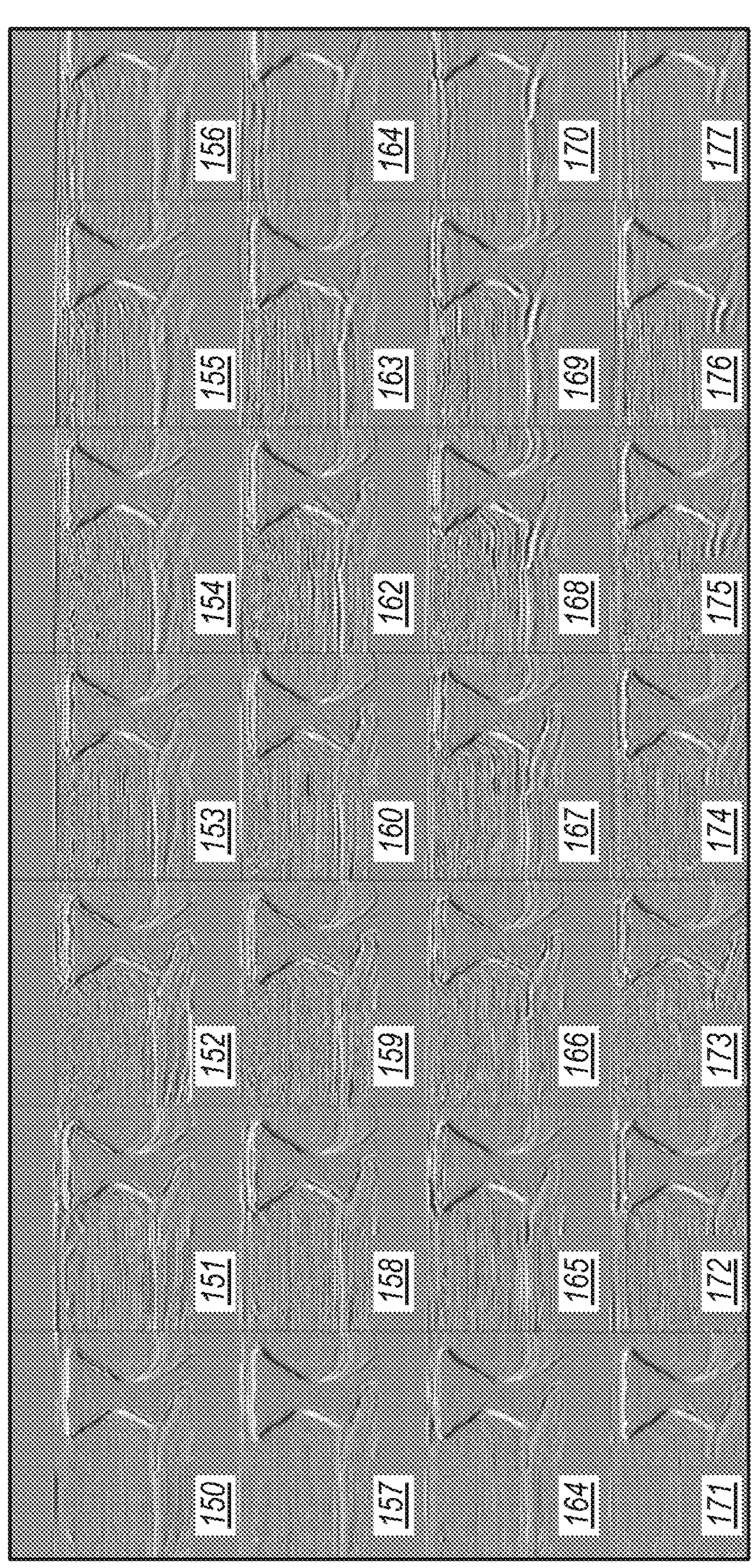
FIG. 6 illustrates examples of seismic images formed using Full waveform inversion (FWI) angle gathers.

Referring now to FIG. 6, examples of a plurality of seismic images 150-177 of a subsurface region obtained from the execution of method 100 are shown. Particularly, seismic images 150-177 correspond to a plurality of FDR angle gathers which desirably carry the features obtainable from RTM angle gathers including, for example, different illuminations at different angles, higher resolution at near angles, and cleaner images at far angles. In addition, the FDR angle gathers in at least some instances have more balanced amplitudes, broader band (e.g., higher resolution), and illumination compensation than what may typically be obtained from RTM angle gathers, rendering the FDR angle gathers superior in at least some respects than RTM angle gathers.

In some embodiments, seismic images 150-177 may be obtained together from the execution of the method 100 shown in FIG. 5. For example, each seismic image 150-177 may correspond to either a unique reflection angle (e.g., reflection angles of 0°, 11.25°, 22.5°. 33.75°, 45°, 56.25°, 67.5° corresponding to the seven vertical columns of seismic images 150-177 shown in FIG. 6) or a unique azimuth angle (e.g., azimuth angles of 0°, 45°, 90°, 135° corresponding to the four horizontal rows of seismic images 150-177 shown in FIG. 6). The reflection and azimuth angle bins can be smaller or bigger based on the needs.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A method for implementing a full waveform inversion (FWI) process using angle gathers, the method comprising:

(a) receiving observed seismic data associated with a subsurface region and captured by one or more seismic receivers;

(b) constructing, based on the observed seismic data, a scalar velocity model and one or more vector velocity model partitions, wherein the one or more vector velocity model partitions correspond to one or more unique seismic angles;

(c) determining one or more vector gradients using the scalar velocity model and the observed seismic data;

(d) updating the one or more vector velocity model partitions using the one or more vector gradients;

(e) determining residual data by comparing synthetic data produced by the scalar velocity model with the observed seismic data; and (f) migrating the residual data backwards through time to determine the one or more vector gradients.

2. The method of claim 1, further comprising:

(g) determining the one or more unique seismic angles as the residual data is migrated backwards through time.

3. The method of claim 1, wherein the one or more unique seismic angles comprises at least one of a reflection angle and an azimuth angle.

4. The method of claim 1, wherein the one or more unique seismic angles comprises both a reflection angle and an azimuth angle.

5. The method of claim 1, wherein (b) comprises constructing an initial one or more vector velocity model partitions from the observed seismic data, and (d) comprises iteratively updating the one or more vector velocity model partitions using the one or more vector gradients.

6. The method of claim 5, further comprising:

(g) generating synthetic data from the scalar velocity model.

7. The method of claim 6, further comprising:

(h) determining residual data by comparing the synthetic data with the observed seismic data.

8. The method of claim 1, wherein the one or more vector gradients comprises a plurality of separate vector gradients, and wherein (d) comprises applying a single step length to each of the plurality of separate vector gradients.

9. A system for implementing a full waveform inversion (FWI) process using angle gathers, the system comprising:

a processor;

a non-transitory memory; and one or more applications stored in the non-transitory memory that, when executed by the processor:

access observed seismic data associated with at least a portion of a subsurface formation from a seismic data acquisition device;

construct, based on the observed seismic data, a scalar velocity model and one or more vector velocity model partitions, wherein the one or more vector velocity model partitions correspond to one or more unique seismic angles;

generate, based on the scalar velocity model, synthetic data;

determine residual data by comparing the synthetic data with the observed seismic data;

determine a one or more vector gradient using the scalar velocity model and the observed seismic data; and update the one or more vector velocity model partitions using the one or more vector gradients.

10. The system of claim 9, wherein the one or more applications stored in the non-transitory memory, when executed by the processor:

select a final vector velocity model based on a predefined threshold; and generate one or more images of the subsurface formation using the one or more vector velocity model partitions.

11. The system of claim 9, wherein the one or more applications stored in the non-transitory memory, when executed by the processor:

determine residual data by comparing synthetic data produced by the scalar velocity model with the observed seismic data; and migrate the residual data backwards through time to determine the one or more vector gradients.

12. The system of claim 11, wherein the one or more applications stored in the non-transitory memory, when executed by the processor:

determine the one or more unique seismic angles as the residual data is migrated backwards through time.

13. The system of claim 9, wherein the one or more unique seismic angles comprises at least one of a reflection angle and an azimuth angle.

14. The system of claim 9, wherein:

the one or more vector gradients comprises a plurality of separate vector gradients; and the one or more applications stored in the non-transitory memory, when executed by the processor:

update the one or more vector velocity model partitions using the one or more vector gradients by applying a single step length to each of the plurality of separate vector gradients.

15. A method for implementing a full waveform inversion (FWI) process using angle gathers, the method comprising:

(a) receiving observed seismic data associated with a subsurface region and captured by one or more seismic receivers;

(b) constructing, based on the observed seismic data, a scalar velocity model of the subsurface region and one or more vector velocity model partitions that are different from the scalar velocity model, wherein the one or more vector velocity model partitions correspond to one or more unique seismic angles;

(c) determining a scalar gradient using the scalar velocity model and the observed seismic data;

(d) determining one or more vector gradients using the scalar velocity model and the observed seismic data; wherein, the scalar gradient comprises a sum or weighted average of the vector gradients (e) updating the scalar velocity model using the scalar gradient; and (f) updating the one or more vector velocity model partitions using the one or more vector gradients.

16. The method of claim 15, wherein the scalar velocity model comprises a normalized stack of the one or more vector velocity model partitions, the vector velocity model partitions being stacked along the one or more unique seismic angles.

17. The method of claim 16, wherein the one or more unique seismic angles comprises at least one reflection angle and at least one azimuth angle.

18. The method of claim 15, further comprising:

(g) selecting a final vector velocity model based on a predefined threshold; and (h) generating one or more images of the subsurface region using the one or more vector velocity model partitions.

19. The method of claim 15, wherein the one or more unique seismic angles comprises at least one of a reflection angle and an azimuth angle.

* * * * *